United States Patent [19]

Gleason et al.

[11] Patent Number: 5,682,488
[45] Date of Patent: Oct. 28, 1997

[54] VARIABLE COMPUTER ICON FOR SINGLE CONTROL OF COMPLEX SOFTWARE FUNCTIONS EXECUTED ON A DATA PROCESSING SYSTEM

[75] Inventors: Quynh Dang Gleason, Germantown, Md.; Christine D. Quay, Cary, N.C.; Eric D. Singer, North Potomac, Md.; Maria Elena Smith, Plantation, Fla.

[73] Assignee: International Business Machine Corp., Armonk, N.Y.

[21] Appl. No.: 415,886

[22] Filed: Apr. 3, 1995

[51] Int. Cl.$^6$ .................................................. G10H 1/057
[52] U.S. Cl. .................................................. 395/348; 395/326
[58] Field of Search .................................................. 395/159, 161, 395/155, 326, 333, 348, 349

[56] References Cited

U.S. PATENT DOCUMENTS

| 5,191,645 | 3/1993 | Carducci et al. | 395/159 |
| 5,559,301 | 9/1996 | Bryan, Jr. et al. | 395/159 |

*Primary Examiner*—Phu K. Nguyen
*Assistant Examiner*—Cliff N. Vo
*Attorney, Agent, or Firm*—Edward H. Duffield

[57] ABSTRACT

A variable computer icon on a display functions as a single control for a data processing system exercising a complex software function using multiple parameters. As the single control is varied on the display by a user, the response of the complex software function due to automatic parameter changes is varied. Moving the single control in one direction increases the response of the function. Moving the single control in the opposite direction decreases the response of the function. A method is provided for generating settings on the icon to provide smooth, gradual transition with consistent behavior of the function between $S_{min}$, the minimum position, to $S_{max}$, the maximum position, on the icon. The single control provides ease of use, simplicity in controlling the execution of a complex software function along with a reduction in space consumed by a graphical user interface and the ability to alter the underlying function without any apparent change to the interface.

10 Claims, 5 Drawing Sheets

| TABLE 1. SEARCH PARAMETER SETTINGS | | | |
|---|---|---|---|
| CASE SENSITIVITY | MORPHOLOGY | WORK PROXIMITY | WORD ORDER |
| 0 | 1 | ∞ | 0 |
| 0 | 1 | 4 | 0 |
| 0 | 1 | 3 | 0 |
| 0 | 0 | 2 | 0 |
| 0 | 0 | 2 | 1 |
| 0 | 0 | 1 | 1 |
| 1 | 0 | 1 | 1 |
| 1 | 0 | 0 | 1 |

$S_{MIN}$ is the first row; $S_{MAX}$ is the last row.

FIG. 6A

| TABLE 2. INSURANCE PARAMETER QUALITY SETTINGS | | | |
|---|---|---|---|
| COLLISION | COMPREHENSIVE | PERS. INJ. PROTECT | RENTAL CAR |
| 10 | 10 | 20 | 0 |
| 10 | 20 | 20 | 0 |
| 50 | 20 | 20 | 0 |
| 50 | 20 | 20 | 1 |
| 50 | 30 | 20 | 1 |
| 50 | 30 | 50 | 1 |
| 100 | 30 | 50 | 1 |

$S_{MIN}$ is the first row; $S_{MAX}$ is the last row.

VARIABLE COMPUTER ICON FOR SINGLE CONTROL OF COMPLEX SOFTWARE FUNCTIONS EXECUTED ON A DATA PROCESSING SYSTEM

BACKGROUND OF THE INVENTION

1. Technical Field

The present invention relates to data processing systems performing complex software functions. More particularly, the invention relates to a system and methods for single, adjustable control of a complex software function executed in a data processing system using a variable computer icon.

2. Description of the Related Art

Many data processing systems executing complex software functions based upon a number of parameters, such as identifying documents in an information retrieval system or calculating insurance coverage or selecting investments or evaluating process changes, rely on a set of controls for the setting of the parameters of the complex software function. A system user is required to understand the operation of each individual control in order to achieve the desired results from the complex function. End user interfaces for such complex functions involving several parameters, typically consist of one control for each parameter thereby requiring users to understand what each parameter represents, what the allowable settings are and their combined effect. These controls may be dissimilar in type, i.e., they may differ in measure, range, domain, granularity, and effect. For example, in an information retrieval system allowing search requests on words and phrases, users are typically presented with a list of parameters, such as case sensitivity, morphology, and word proximity (allowable distance between the words in a phrase). Ease of use for such retrieval systems is typically low and periods of non-use frequently necessitate re-learning. Moreover, the strictness of search results is not readily controllable in such systems.

In the prior art, U.S. Pat. No. 4,879,648 and U.S. Pat. No. 5,206,949, a continuation of the '648 patent, disclose a method of displaying search terms or data sets which requires the user to actuate only a limited number of control key inputs, a scrolling key and a select key to control the desired terms and categories to search through a data base.

U.S. Pat. No. 5,195,034 discloses the application of "fuzzy" concepts to search strategies. The '034 patent discloses a data processing system for performing a search which uses a plurality of sortable keys. Each sortable key is assigned an alphabetic key value, a diacritic value, a case key value, and a special character key value. When specifying criteria for a search, all four key values may be specified, thus permitting a search to focus exactly upon a desired alphabetic value, diacritic character value, case value and special character value for a desired alphabetic string. In a "fuzzy" or "quasi" search, those characters or keys which match the desired alphabetic value but which ignore one or more of the other key values, are selected. That is, for example, diacritic marks may be ignored, or case distinctions may be ignored at the option of the user.

In U.S. Pat. No. 5,263,174 a menu selection process is disclosed for a computer system whereby successive keystrokes entered by a user will cause the display of a menu which dynamically reflects the range of choices corresponding to the keystrokes. As a keystroke is entered, the set of choices which corresponds to the keystroke entered is immediately reduced which presumably simplifies the selection process for the user.

In U.S. Pat. No. 5,020,019 a document retrieval system is disclosed which provides a user with multiple choices from a numerical value between zero and one in making an evaluation of whether an output document is actually in conformity with the strictness of the query.

In U.S. Pat. No. 5,184,120 a radio telephone system is disclosed which uses a force sensing resistor as a selector key for selecting a range of menu items and associates a variable press by the user to control the range of selection of the menu items.

In U.S. Pat. No. 4,914,568 and U.S. Pat. 5,301,336, a continuation of the '568 patent, a variable computer icon is disclosed in a graphical system for modeling a computer process. The variable computer icon provides variable input data into the process according to the setting of the variable computer icon. The '568 and '336 patents do not disclose using the variable computer icon to combine multiple parameters.

None of the prior art discloses a single control for a plurality of individually set parameters in a data processing system executing a complex software function, as for example, related to information retrieval or process evaluation or a selection system for insurance or investments. Nor does the prior art disclose a single information retrieval control for a data processing system which can be used to set the strictness of a matching function viewed to determine how closely a request described in terms of various parameters matches the output of the data processing system to such request.

Using a single control for setting multiple parameters of a software function would improve the use, training, and understanding of such systems. Also, a single control will reduce the space consumed in a graphical user interface for the control of an application function. Further, it will facilitate the ability to alter the underlying function without any apparent change to the user interface.

SUMMARY OF THE INVENTION

An object of the present invention is an improved data processing system for executing complex software functions using multiple parameters whereby the system can provide a range of results as parameters are changed using a single control.

Another object is a single control for a data processing system which can be set to control a complex software function which varies from some arbitrary minimum to maximum output related to a user input to such system.

Another object is a single control for a data processing system, which provides a smooth, gradual, variation in the results of executing a complex software function.

Another object is a single control for a data processing system executing a complex software function using multiple parameters whereby a user does not need to understand the operation of controlling each parameter in exercising the complex software function.

Another object is a single control for a data processing system exercising a complex software function using multiple parameters which allows changes to the function without affecting the single control.

Another object is an adjustable computer icon or image to control a complex software function in response to a user input to the system.

Another object is an adjustable scroll bar in a data processing system which controls the execution of a complex software function using parameter settings which range from minimum to maximum effect on the function.

Another object is a method for calculating the settings on an adjustable scroll bar controlling the response of a data processing system in a consistent manner with respect to such settings in executing a complex software function using multiple parameters.

Another object is a method of automatic generation of control settings in an adjustable scroll bar as a single control element in a data processing system executing a complex software function using multiple parameters.

In one example, these and other objects and features are achieved in an information retrieval system comprising a processor, a display, an I/O device, a data base and a storage means including a stored program which provides instructions to the processor for operating a variable computer icon or related image, i.e., scroll bar or dial under the control of a user. The icon includes indicia representing the strictness of a search, as selected by the user, in the retrieval system using a plurality of search parameters. As the user adjusts the position of the variable computer icon, a search algorithm in the retrieval system controls the matching of data base items to search requests in a range from minimum to maximum search strictness, according to the position of the variable computer icon by the user.

The positions on the variable computer icon may be automatically generated for software functions comprised of independent parameters, such as the matching function of an information retrieval system. The process consists of creating a table of parameter settings derived by monotonically varying each parameter from its minimum to its maximum value. A maximum setting, $S_{max}$, on an information retrieval icon would be the combination of search parameters which provide the fewest "hits" between the search requests and search results. The minimum setting, $S_{min}$, on the icon would be the combination of parameters which provide the most "hits" between search requests and search results. $S_{min}$ and $S_{max}$ are the first and last table entries, respectively. The search strictness obtained from these settings are referred to as $F_{max}$ and $F_{min}$, and may be estimated as the average number of "hits" with these settings for a large sample of search requests. Thus, the average change or delta between adjacent positions will be the difference between $F_{max}$ and $F_{min}$ divided by the number of icon settings n. This average delta is the desired search strictness difference between adjacent positions in order to obtain smooth variations in the system's results.

To automatically generate the other parameter settings, each search parameter is monotonically varied from its minimum to its maximum strictness setting. Stating with $S_{min}$, the average number of "hits" is calculated when each parameter is individually increased to its next allowable setting in its range. The setting with parameter increase yielding a search strictness difference closest to the average delta is selected and added to the table. This process is repeated until all of the parameters have reached their maximum setting, $S_{max}$.

Certain parameters governing orthogonal aspects of a retrieval function may not be incorporated into the combined-parameter control. One example would be the search scope parameter, which may be used to limit the search to titles, abstracts, etc. This parameter has an effect on the number of items retrieved, but does not directly affect the strictness of the search matching functions. This parameter cannot be combined with the strictness parameters but, instead, must remain separate.

In summary, a system and method is disclosed for providing a computer user with a single control which may continuously and variably adjust multiple parameter functions.

These and other features and advantages of the present invention will become more apparent from the following more detailed descriptions of exemplary embodiments as illustrated in the accompanying drawings.

DETAILED DESCRIPTION OF THE PREFERRED EMBODIMENT

Figure 1:
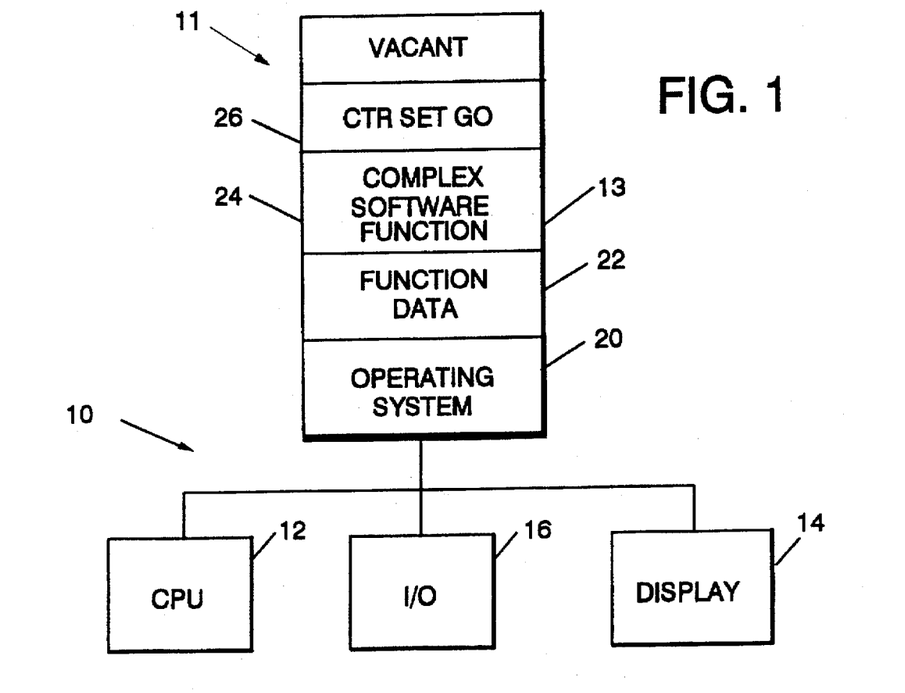
FIG. 1 is a block diagram of the elements included in a data processing system having a display; a memory containing a data base and various stored program instructions for (a) operating the system; (b) performing a complex software function; and (c), inter alia, calculating the settings on a variable computer icon.

Referring to FIG. 1, a conventional data processing system 10, such as an IBM PC is adapted to execute a complex software function related to using a single control element. The system includes a cpu 12, memory 11, display 14, and an input/output device 16, such as a standard IBM keyboard (not shown).

The memory 11 includes a series of stored program instructions for (1) controlling the data processing system; (2) performing a complex software function; and (3) generating a variable computer icon with settings controlling the function. Included in the memory is an operating system 20 such as a standard disk operating system (DOS) or the like; a program 24 for executing the complex software function; possibly, stored data 22 used by the complex software function; and a controlled setting generator program 26. For example, the memory for an information retrieval system will contain a data base search program, such as IBM Search Manager for searching the textual data base 22 which may be in the form of all issued U.S. patents. The program 26 is used in connection with a variable computer icon 28 displayed on a screen 30 of the display 14 shown in FIG. 2. The program 26 is used to generate an arbitrary number n of settings 32 on the icon 28 along a scroll bar 34 including a slidable member 36 under control of the I/O device 16, such as a keyboard or mouse. Although the variable computer icon 28 is shown as a slidable scroll bar, the icon may exist in other forms such as a dial or other position indicators that may or may not be numeric.

Typically, a complex software function is dependent on several parameters controlling the effect of the function. For example, in an information retrieval system which allows search requests consisting of words and phrases, users are typically presented with a list of defined parameters, such as case sensitivity, morphology, word proximity, and word order. The present invention permits a single control 28 (see FIG. 2) to be used to set the strictness of the matching function used to determine how closely the search request matches the system response. On the most lenient setting of the control 28, the match function permits casing and morphological variations of the words in the search request, while on the strictest setting, the match function requires words to appear exactly as stated in the search request.

Figure 2:
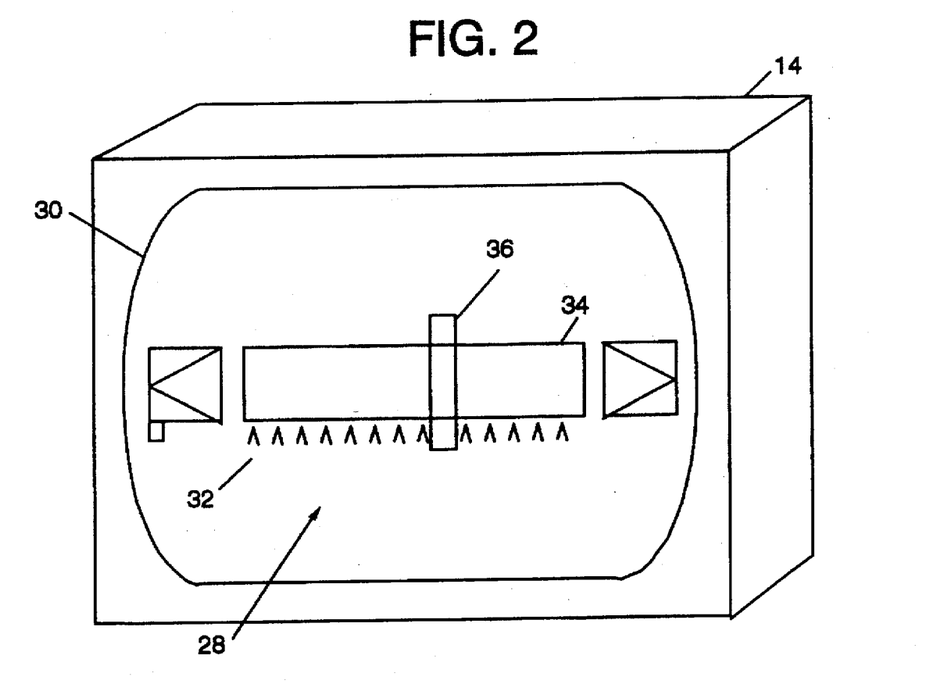
FIG. 2 is a pictorial representation of the display included in FIG. 1 showing a variable computer icon in the form of a slidable scroll bar with settings indicating various positions of the slider on the scroll bar.

The control 28 has a fixed granularity, that is, the number of settings or positions in which it may be placed. Each position corresponds to a predefined setting of all of the function parameters. The values associated with each search parameter, through its range, must be in linear order with the minimum setting on one end of the spectrum, and the maximum setting on the other to ensure that the system functions with "consistent behavior" as the control is moved from its minimum to its maximum position.

A user dissatisfied with the results of a search request can move the slider as follows:

If there were too many matches, the slider is moved towards the maximum strictness position.

If there were too few matches, the slider is moved towards the minimum strictness position.

Moving the slider towards the maximum strictness position guarantees that a subset of the previously retrieved articles will be retrieved. Moving the slider toward the minimum strictness position guarantees that a superset of the previously retrieved articles will be retrieved. This is what is meant by "consistent behavior".

As an implementation example, consider an information retrieval system allowing search requests consisting of a list of words and phrases using the controlling parameters: case sensitivity, morphology, word proximity and word order defined as follows:

Case Sensitivity

Used to indicate whether casing differences between search request words and stored database text words are significant. For example, a user interested in articles about the Equal Rights Amendment, could enter a search request *ERA* with case sensitivity turned on to indicate that case variations, such as "ERA" and "era" are not to be considered matches.

Possible Settings: Off=0, On=1

Morphology

Used to indicate whether tense differences in verbs and singular, plural differences in nouns are to be ignored. For example, a user interested in bats, nocturnal flying mammals, could enter search request "bat", with morphology turned off to avoid matching baseball articles containing words such as "batting" and "batted".

Possible Settings: Off=0, On=1

Word Proximity (for Phrases)

Used to set the maximum number of intervening words between the words in a search request phrase that are allowed in the source text to be considered a match. For example, a user interested in articles about the "solar system", would select word proximity equals zero to avoid matching articles containing sentences like: "Solar cells were used to power the system."

Possible Settings: 0, 1, 2, 3, 4, Infinity

Word Order (for Phrases)

Used to indicate whether words in a search request phrase are required to appear in a specified order. For example, a user interested in "computing theory", could turn word order "off" in order to match phrases like: "Theory Of Computing".

Possible Settings: Off=0, On=1

There are 48 possible settings among these parameters. The control marker 28 cannot contain all of them because:

Not all settings make sense. For example, a user that sets word proximity to "infinity" (so that the phrased words can be arbitrarily far apart) is not likely to care whether the word order given in a search request is preserved.

No ordering of all of the settings can ensure the consistent behavior described earlier. For example, consider settings:

Setting 1:S1=(Case Sensitivity=0, Morphology=0, . . . )

Setting 2:S2=(Case Sensitivity=1, Morphology=1, . . . )

No matter what order is chosen for these two settings, consistent behavior cannot be achieved. For example, consider a data base with two documents:

Document A: "The announcement made by Apple Computer Company led to a rise in stock".

Document B: "The price of apples is expected to rise."

Consider search request—"apple". Given setting S1, Document A is retrieved, while given setting S2, Document B is retrieved. So, no matter how these two settings are ordered, a completely different set of documents is retrieved. This demonstrates why the assignment of parameter settings to the control positions is not straight-forward. Ideally, an expertly trained individual would be the one making these assignments by taking into account the usefulness of each setting to end users and the effect that each setting has on the overall function.

Figure 3:
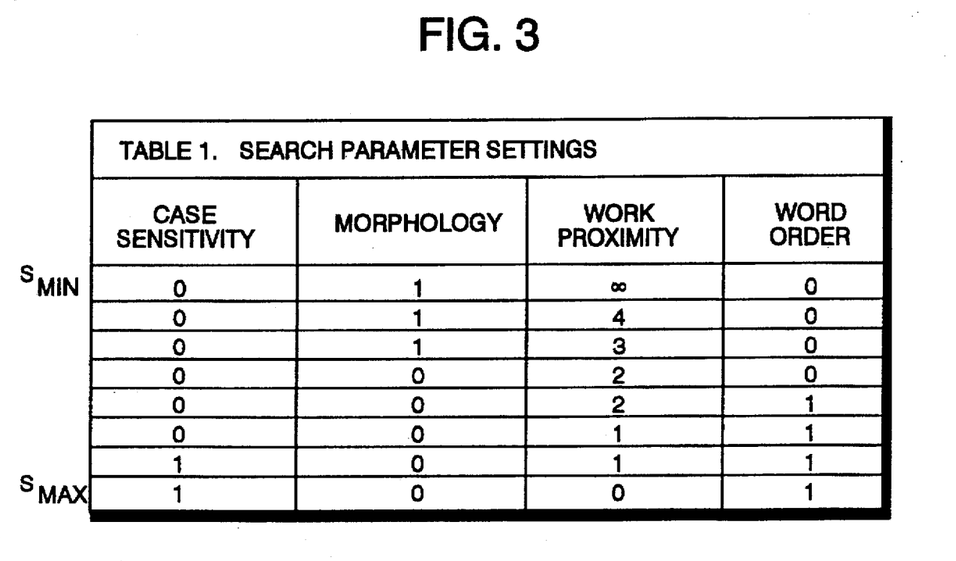
FIG. 3 is a table of search settings varied between maximum ($S_{max}$) and minimum ($S_{min}$) for search strictness, the table entries indicating the setting for each search parameter on a single control as the parameters change monotonically between $S_{min}$ and $S_{max}$.

A possible assignment of parameter settings for a search function is shown in FIG. 3.

Figure 4:
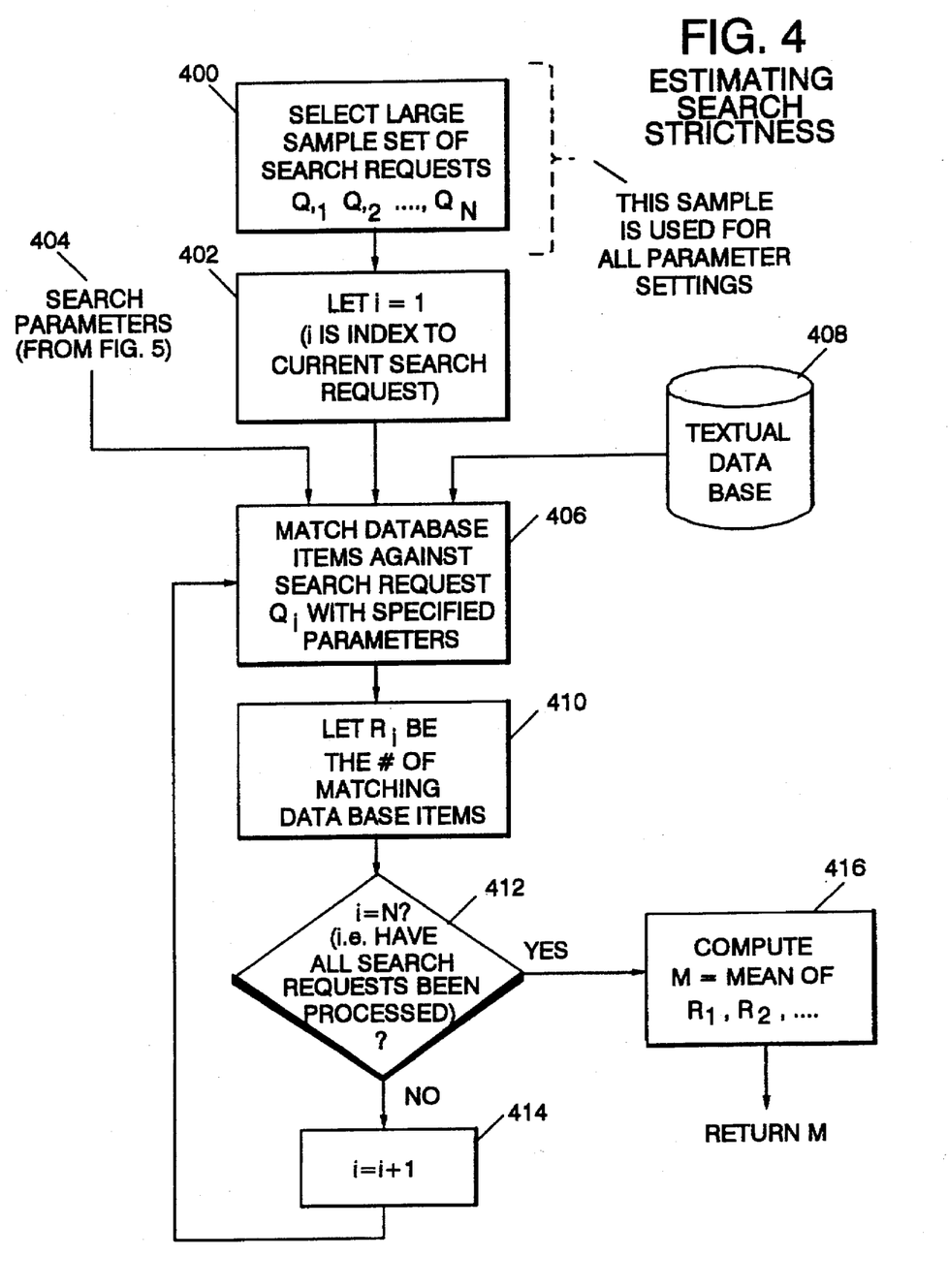
FIG. 4 is a flow diagram for experimentally estimating the search strictness of an information retrieval search specified for a set of parameter settings.
Figure 5:
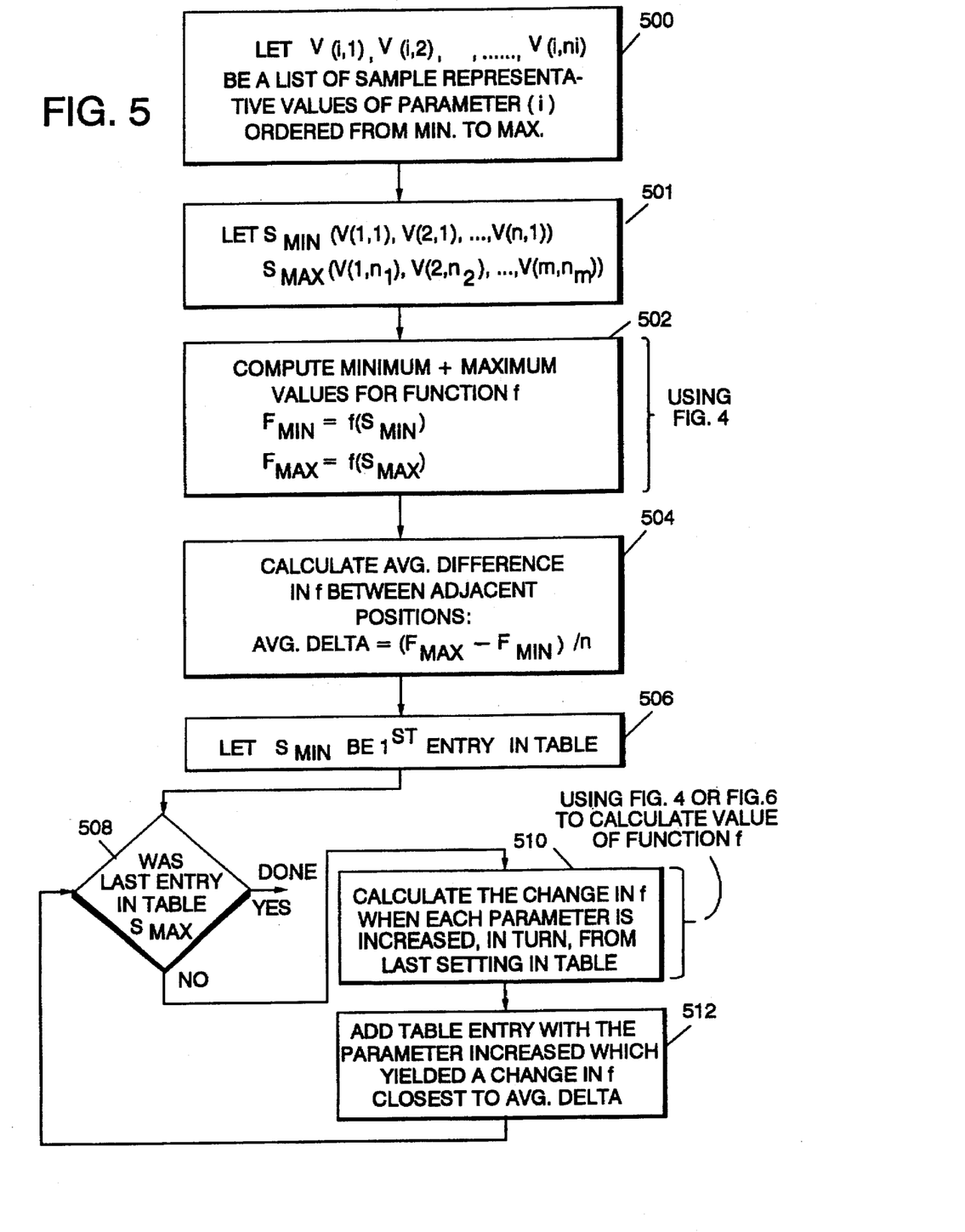
FIG. 5 is a flow diagram for generating parameter settings on a single control for a data processing system executing a complex software function having multiple independent monotonic parameters.

Referring to FIGS. 4 and 5, the processes to be described may be used to automatically generate search parameter settings in FIG. 3 guaranteeing that the consistency condition is satisfied. Before describing FIGS. 4 and 5, certain terms must be defined, as follows:

f=Function
n=Granularity of function control (number of settings)
S1 . . . Sn=Parameter Settings
m=Number of Parameters
p(i, j)=Value of parameter i in jth position The parameter settings for each position:

$$S1 = [P(1, 1), P(2, 1) \ldots p(m, 1)]$$
$$S2 = [P(1, 2), P(2, 2) \ldots p(m, 2)]$$
$$\ldots$$
$$Sn = [p(1, n), p(2, n) \ldots p(m, n)]$$

Satisfy the following:
f(S1)<f(S2)< . . . <f(Sn)
(Consistency condition described in example above)
$p(i, 1) \leq p(i, 2) \leq \ldots \leq p(i, n)$ or
$p(i, 1) \leq p(i, 2) \leq \ldots p(i, n)$
(Depending on whether parameter i is inversely related to function f)

Referring to FIG. 4, a process is described for measuring the search strictness of a given set of parameter settings. In operation 400, a large set of search requests $Q_1, Q_2, \ldots, Q_n$ is provided as input to the process. A pointer index is set in operation 402 to the first search request. A set of search parameters 404, described above, i.e. case sensitivity; morphology; word proximity and word order are provided as inputs to a comparison operation 406. Also provided as an input to the operation 406 is a textual database 408. The operation 406 compares each search request $Q_1 \ldots Q_n$ given the specified parameters against the items stored in the data base 408. The number of database items matching the search requests in terms of the parameters are stored in an operation 410. A comparison operation 412 determines when all search requests have been processed. A "No" condition initiates an operation 414 to increment the operation 408 to the next search request. When all search requests have been processed, a "Yes" condition for the operation 412 initiates an operation 416 to compute the mean database response M for the search requests.

Referring to FIG. 5, an operation 500 establishes a list of sample representative values $V(i, 1), V(i, 2), \ldots V(i, n)$ of all parameters ordered from minimum to maximum. The $S_{min}$ and $S_{max}$ settings are defined for all parameters in operation 501. The minimum and maximum function values for the $S_{min}$ and $S_{max}$ are computed in an operation 502 using the process of FIG. 4. The computed $F_{min}$ and $F_{max}$ are provided as inputs to an operation 504 which calculates an average "delta" difference between adjacent positions by subtracting "$F_{min}$" from "$F_{max}$" and dividing by "n" the number of settings 32 on the variable computer icon 28, the delta to be used for determining the parameter settings for the positions 32 on the variable icon 28 (see FIG. 2).

In an operation 506 the first set of parameter settings (first table entry) is set at the minimum or least strict search setting for each individual parameter, as shown for example, in FIG. 3 where:

$S_{min}$: Case sensitivity=0; Morphology=1; Word Proximity=infinity; and Word Order=0

A comparison operation 508 is performed between the last table entry and $S_{max}$. A "no" condition indicates some parameter has not reached its maximum setting which initiates an operation 510 to calculate the change in "f" when each parameter is increased, in turn, to the next level, using the process of FIG. 4. The value returned by the process of FIG. 4 is supplied to the operation 512 for determining which parameter increase leads to a change in "f" closest to the average delta. The next table entry is created in operation 516 with the selected parameter increase being the only changed parameter value. As can be seen in FIG. 3, the next set of parameter settings which corresponds to a change in "f" closest to the average delta occurs when "word proximity" is increased to the next level "4" and the other search parameters remain at the $S_{min}$ setting.

The processes of operations 510 and 512 are repeated until the last set of parameter settings is equal to $S_{max}$. Returning to FIG. 3, it will be observed the strictness of the search increases in terms of case sensitivity, morphology, word proximity and word order at each row of FIG. 3 beginning at the top row and ending at the bottom row. Each row of FIG. 3 represents a position on the variable icon 28 shown in FIG. 2, the strictness of the search request being increased as the slidable member 36 moves from left to right on the guide 34. Conversely, the leniency of the search request increases as the slidable member 36 moves from right to left along the guide 34 in FIG. 2.

Another example of a single control for a complex software function is an insurance selection system, that is, selecting the amount of insurance with respect to several parameters to control the quality of coverage calculated as the gap between the loss or expenses connected with an event such as an accident, death, loss of an asset, or the like, and the amount the insured may be required to pay over and above the insurance amount.

In an auto insurance selection system several parameters such as coverage for collision, comprehensive, personal injury protection, and use of a rental car may be compared with an accident history data base in which is stored the records of previous accident claims. A single control can be applied to a complex software function using insurance coverage parameters and an accident history data base to provide a prediction of the total annual cash outlay by an insured at the time of an accident and the expected coverage gap between the expense of the accident and the amount payable by the insurer.

As an example, consider automobile insurance coverage where coverage is "controlled" by four parameters whose range of values may be the following:

| INSURANCE | COVERAGE AMOUNT ($00) |
| --- | --- |
| Collision | 10–50–100 |
| Comprehensive | 10–20–30 |
| Personal Injury Protection | 20–50 |
| Rental Car | 00–1 |

Figure 6:
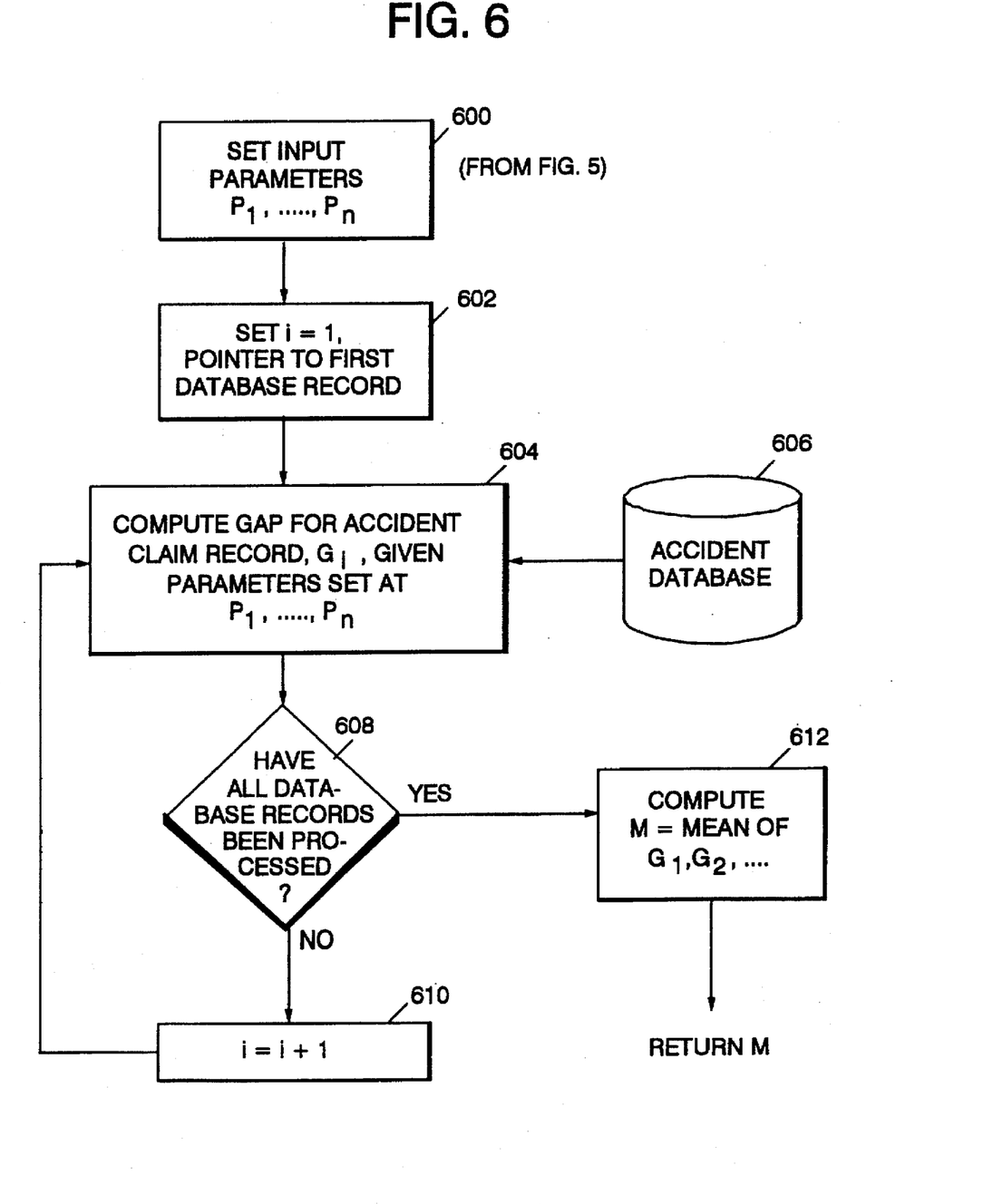
FIG. 6 is a flow diagram for estimating the quality of an insurance coverage based upon previously filed claims.

Turning to FIG. 6, the quality of coverge computed by function "f" for a specific set of parameter values may be calculated using the process shown therein, as follows:

An operation 600 inputs the individual insurance parameter settings as $p_1, \ldots p_n$. An operation 602 sets a pointer to the first record of an accident data base 606. An operation 604 computes the insurance gap $G_1$, for the the data base record given the coverage specified by the input parameter. The insurance gap is calculated by subtracting the amount the insurer is required to pay given the specified coverage from the total accident expenses. Operation 608 determines when all accident data base records have been processed. A "no" condition for the operation 608 initiates an operation 610 which increments the pointer to the next data base record used by operation 604 which is continued until all data base records have been processed. A "yes" condition for the operation 608 initiates an operation 612 to compute the mean of all the insurance gaps calcuated in operation 604. This process is used to compute the value of "f" in operations 502 and 510 of FIG. 5.

Figure 6A:
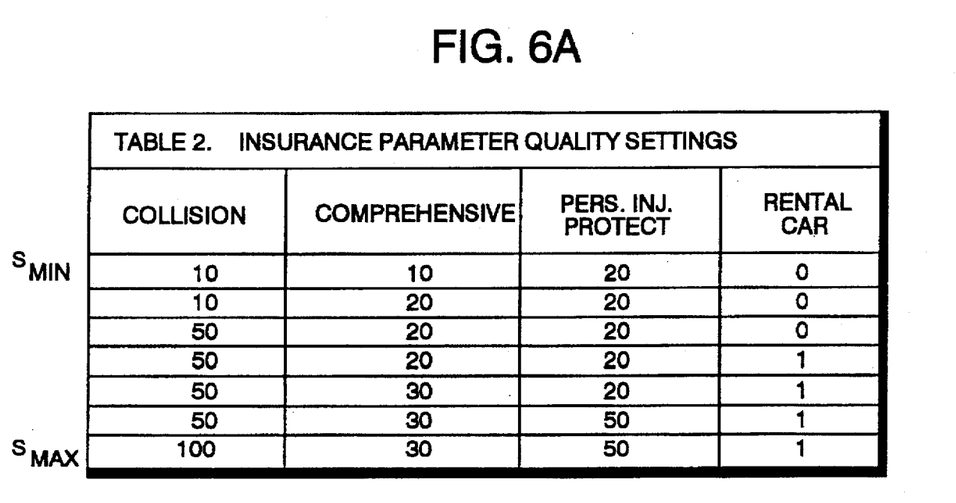
FIG. 6A is a table of possible settings on the single control of FIG. 6 as the parameters change monotonically between $S_{min}$ and $S_{max}$ of a function "f" indicative of the insurance gap between the accident related expenses and the amount the insured is required to pay.

FIG. 6A is a Table of Insurance Quality Settings ordered from minimum to maximum insurance gap based on the accident claim data base. An insured dissatisfied with the quality of coverage or the amount of premium can move the slider on the icon as follows:

If the predicted gap is too high, the slider is moved towards the maximum quality position.

If the premium is too high, the slider can be moved towards the minimum quality position.

Accordingly, the insurance selection system using parameter settings shown in FIG. 6A obtained by the methods in FIGS. 5 and 6 provides a single control for selecting insurance coverage, according to an insured's needs without an understanding of the insurance parameters or their effect on the insured's premium as the insurance gap is varied.

In general, the present invention has described a system and method for combining the parameters of a complex software function under a single control for improved ease of use. In one example, the single control sets the search strictness of an information retrieval system. In another example, the single control enables an auto insuree to easily select an insurance package providing a desired quality of coverage. The single control provides ease of use, simplicity in controlling the execution of a complex software function along with a reduction in space consumed by the graphical user interface and the ability to alter the underlying function without any apparent change to the interface.

While the invention has been described in terms of specific embodiments, it is apparent that the processes and parameters may be varied without departing from the spirit and scope of the invention:

What is claimed is:

1. In a data processing system including a processor, a display including a variable computer icon, a memory, a data base stored in the memory and an input device, the method of generating settings in a variable computer icon for controlling a complex software function "f" executed by the system comprising the steps of:
   a) selecting values for the parameters;
   b) selecting the granularity n of each parameter for minimum to maximum effect on the function "f";
   c) computing the minimum response and maximum response from the data base for "f" using the selected parameters;
   d) computing the average delta for the change in data base response as the selected parameters are altered, the average delta being $F_{max}-F_{min}$ where $F_{max}$ is the maximum response of "f"; $F_{min}$ is the minimum response of "f"; and n is the number of setting positions on the icon;
   e) calculating the change in "f" as each parameter is increased from the minimum position on the icon (Smin) and selecting the data base response closest to the average delta;
   f) denoting a position on the variable computers icon where the change in the parameters is closest to the average delta; and
   g) repeating the steps above until the maximum position (Smax) is reached on the variable computer icon.

2. The method of claim 1 further including the steps of:
   h) selecting a plurality of inquiries to the data base in ordered relation relative to a plurality of parameters;
   i) comparing each inquiry to the database to identify the inquiries that match the data base response to such inquiries;
   j) computing the mean data base response for all the matching inquiries to the data base; and
   k) providing the mean data response as an input to step c.

3. The method of claim 1 wherein each setting position on the icon corresponds to a pre-defined position of all "f" parameters and the positions have a fixed granularity between an Smax and an Smin.

4. The method of claim 1 wherein the minimum data base response for the parameters is used to calculate the next data response closest to the average delta as the next setting position on said icon.

5. The method of claim 2 wherein the database is a textual information in the form of claims or documents.

6. In a computer system comprising a processor, a display, a memory, a database, a variable control icon, an input device for altering the display of said variable control icon and a machine-readable medium having recorded thereon machine-readable and executable process steps for generating settings for said variable control icon of:
   a) selecting values for the parameters;
   b) selecting the granularity n of each parameter for minimum to maximum effect on the function "f";
   c) computing the minimum response and maximum response from the data base for "f" using the selected parameters;
   d) computing the average delta for the change in data base response as the selected parameters are altered, the average delta being Fmax–Fmin where Fmax is the maximum response of "f"; Fmin is the minimum response of "f"; and n is the number of setting positions on the icon;
   e) calculating the change in "f" as each parameter is increased from the minimum position on the icon (Smin) and selecting the data base response closest to the average delta;
   f) denoting a position on the variable computer icon where the change in the parameters is closest to the average delta; and
   g) repeating the steps above until the maximum position (Smax) is reached on the variable computer icon.

7. The medium of claim 6, further including machine-readable and executable steps for:
   h) selecting a plurality of inquiries to the data base in ordered relation relative to a plurality of parameters;
   i) comparing each inquiry to the database to identify the inquiries that match the data base response to such inquiries;
   j) computing the mean data base response for all the matching inquiries to the data base; and
   k) providing the mean data response as an input to step c.

8. The medium of claim 6, further including machine-readable and executable steps for:
   establishing a fixed granularity n between a given Smax and Smin.

9. The medium of claim 6, further comprising machine-readable and executable steps for:
   calculating from the minimum data base response for the parameters the next data response closest to the average delta as the next setting position on said icon.

10. The medium as described in any one of claims 6–9 wherein said data base contains machine-readable textual information.

* * * * *